United States Patent
Grice

(10) Patent No.: US 10,680,807 B2
(45) Date of Patent: Jun. 9, 2020

(54) QUANTUM SELF-AUTHENTICATING TIMING SYSTEM

(71) Applicant: UT-Battelle, LLC, Oak Ridge, TN (US)

(72) Inventor: Warren P. Grice, Oak Ridge, TN (US)

(73) Assignee: UT-Battelle LLC, Oak Ridge, TN (US)

(*) Notice: Subject to any disclaimer, the term of this patent is extended or adjusted under 35 U.S.C. 154(b) by 279 days.

(21) Appl. No.: 15/989,322

(22) Filed: May 25, 2018

(65) Prior Publication Data

US 2018/0351738 A1 Dec. 6, 2018

Related U.S. Application Data

(60) Provisional application No. 62/512,246, filed on May 30, 2017.

(51) Int. Cl.
*H04L 9/08* (2006.01)
*G01S 19/30* (2010.01)
(Continued)

(52) U.S. Cl.
CPC .......... *H04L 9/0852* (2013.01); *G01S 19/243* (2013.01); *G01S 19/256* (2013.01); *G01S 19/30* (2013.01); *H04L 9/0858* (2013.01); *H04W 12/06* (2013.01); *H04L 9/0838* (2013.01); *H04L 63/0435* (2013.01); *H04L 63/08* (2013.01); *H04L 2463/062* (2013.01); *H04W 12/001* (2019.01); *H04W 12/00502* (2019.01); *H04W 12/04033* (2019.01)

(58) Field of Classification Search
CPC ....... H04L 9/08; H04L 9/0852; H04L 9/0858; H04L 9/0838; H04L 9/0822; H04W 12/06; H04W 12/001; H04W 12/04033; H04W 12/00502
See application file for complete search history.

(56) References Cited

U.S. PATENT DOCUMENTS

| | | | |
|---|---|---|---|
| 6,438,234 B1 | 8/2002 | Gisin et al. | |
| 2002/0041687 A1* | 4/2002 | Parks | H04L 7/0075 380/263 |

(Continued)

OTHER PUBLICATIONS

Fletcher, J.G. et al., "Smart Clocks Have a Hand in the Smart Grid", 2011 IEEE Power and Energy Society General Meeting, San Diego, CA, Jul. 24-29, 2011.

(Continued)

*Primary Examiner* — Kristine L Kincaid
*Assistant Examiner* — Shaqueal D Wade
(74) *Attorney, Agent, or Firm* — Warner Norcross + Judd LLP

(57) ABSTRACT

An improved method of distributing timing information is provided. The method includes transmitting encrypted timing signals from two or more beacons at different locations. The encrypted timing signals are transmitted at regular intervals and are received by a receiver. The receiver then performs a logic operation on the encrypted timing signals and validates, based on the logic operation, the authenticity of the timing signals. The logic operation also results in a decrypted message from the beacons, which can contain additional information, for example, data to be sent back to the beacons to verify receipt.

20 Claims, 3 Drawing Sheets

(51) Int. Cl.
*G01S 19/24* (2010.01)
*H04W 12/06* (2009.01)
*G01S 19/25* (2010.01)
*H04W 12/00* (2009.01)
*H04L 29/06* (2006.01)
*H04W 12/04* (2009.01)

(56) References Cited

U.S. PATENT DOCUMENTS

| | | | | |
|---|---|---|---|---|
| 2005/0078826 | A1* | 4/2005 | Takeuchi | H04L 9/0838 380/255 |
| 2016/0248586 | A1* | 8/2016 | Hughes | H04L 63/08 |
| 2017/0317814 | A1 | 11/2017 | Grice et al. | |
| 2020/0007242 | A1* | 1/2020 | Li | H04B 10/25133 |

OTHER PUBLICATIONS

North American Electric Reliability Corporation, "Real-Time Application of Synchrophasors for Improving Reliability", NERC, Oct. 18, 2010, pp. 1-77.

Hambling, D., "GPS chaos: How a $30 box can jam your life", NewScientist, Issue 2803, published Mar. 12, 2011.

Akkaya, I. et al., "Model-Based Evaluation of GPS Spoofing Attacks on Power Grid Sensors", presented at BEARS 2013, University of California at Berkeley, Feb. 2013.

Symmetricom SyncServer SGC-1500 Data Sheet, www.symmetricom.com, 2012, pp. 1-2.

Stucki, D. et al., "Quantum key distribution over 67 km with a plug&play system", New Journal of Physics, vol. 4, Mar. 2002, pp. 41.1-41.8.

Tippenhauer, N.O. et al., "On the Requirements for Successful GPS Spoofing Attacks", Proceedings of the 18th ACM Conference on Computer and Communications Security, ACM, New York, 2011, pp. 1-12.

O'Hanlon, B.W. et al., "Real-Time GPS Spoofing Detection via Correlation of Encrypted Signals", Navigation, vol. 60, 2013, pp. 1-20.

Bennett, C.H. et al., "Quantum cryptography: Public-key distribution and coin tossing", Theoretical Computer Science, vol. 560, Part 1, Dec. 4, 2014, pp. 7-11.

Shepard, D.P. et al., "Evaluation of the Vulnerability of Phasor Measurement Units to GPS Spoofing Attacks", Sixth Annual IFIP WG 11.10 Conference on Critical Infrastructure Protection, Washington D.C., Mar. 19-21, 2012, pp. 1-10.

ID Quantique Data Sheet, "Clavis2 The Most Versatile Quantum Key Distribution Research Platform", dated Jul. 2014, available at www.idquantique.com.

* cited by examiner

QUANTUM SELF-AUTHENTICATING TIMING SYSTEM

CROSS-REFERENCE TO RELATED APPLICATION

This application claims the benefit of U.S. Provisional Application 62/512,246, filed May 30, 2017, the disclosure of which is hereby incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

The present invention relates to the distribution of timing information between two or more devices, and more particularly, the timing information being quantum authenticated.

The Global Positioning System (GPS) provides accurate timing signals from a constellation of satellites. GPS timing signals can be used either for clock synchronization or, when multiple signals are received, for geolocation. GPS signals are encrypted for military applications, but public GPS signals are not encrypted. Moreover, public GPS signals are formatted according to a well-known and easily reproducible scheme. Consequently, public GPS signals are prone to spoofing attacks in which an adversary broadcasts a false GPS signal with the intent of fooling a GPS receiver into reporting an incorrect location and/or time.

Currently, the electrical power grid relies on GPS for the distribution of accurate timing information with better than 1 millisecond resolution. However, utilities have no control over GPS signals, and, as noted above, GPS signals are vulnerable to spoofing or denial of service attacks. Alternatives that do not rely on GPS signals have been proposed, including terrestrial radio beacons (e.g., eLORAN and WWV) and time correlated methods (e.g., encrypted military GPS signals). However, many of these techniques address only the distribution of timing information, and not the security and integrity of that information.

The lack of alternative secure technologies for time reference and distribution can leave the electrical grid vulnerable to black outs and damage to critical infrastructure. Of particular importance are electrical distribution systems that service customers in urban and suburban areas with load densities that can exceed 60 MW and 3 MW per square mile, respectively. Accurate management of electrical load, generation, and delivery is performed using state estimation and by monitoring key parameters of the electrical grid over a wide area. One instrument that provides this valuable information is the phasor measurement unit (PMU), which delivers accurate snapshots of the grid state at high temporal resolution. However, the current generation of PMUs is dependent on GPS for time synchronization. This dependence on GPS technology leaves these valuable electrical grid assets vulnerable to malicious denial-of-service or spoofing attacks that can bring harm to vital equipment and economic interests.

Accordingly, there remains a continued need for an improved system and method for time synchronization in the electrical power grid and other applications.

SUMMARY OF THE INVENTION

A system and method for the distribution of quantum-authenticated wireless timing signals is provided. The system and method use quantum key distribution (QKD) to authenticate wireless timing signals broadcast by ground-based wireless beacons, which can be decoded by a receiver, optionally a receiver associated with an electrical power grid. The wireless timing signals are broadcast on a predetermined schedule, similar to GPS signals, but with an unpredictable structure, making it difficult for an adversary to spoof the wireless timing signals.

In one embodiment, the method includes transmitting encrypted timing signals from two or more beacons at different locations. The encrypted timing signals are transmitted at regular intervals and are received by a receiver. The receiver then performs a logic operation on the encrypted timing signals and validates, based on the logic operation, the authenticity of the timing signals. The logic operation also results in a decrypted message from the beacons, which can contain additional information, for example data to be sent to the beacons to verify receipt.

The beacons are terrestrial radio beacons or ground stations and are in data communication with each other over an encrypted channel. In the current embodiment, the ground stations are connected over a fiber optic channel, and photonic quantum states are used to generate key material at both locations. If more than two ground stations are used, the timing signals are formatted such that the resulting message requires all signals, and QKD is generalized to quantum secret sharing, whereby quantum correlations are shared between three or more parties.

In another embodiment, the encrypted timing signals are formatted so that different combinations of signals result in valid signals at the receiver. For example, four beacons can produce signals that yield two distinct messages. The beacon pairing can be changed from one transmission to the next, thereby introducing additional complexity for spoofing attacks. Alternatively, the signals can be formatted so that only two are required for authentication, with the others sent as superfluous transmissions. The beacon pairing can be changed from one transmission to the next.

These and other features and advantages of the present invention will become apparent from the following description of the invention, when viewed in accordance with the accompanying drawings and appended claims.

DETAILED DESCRIPTION OF THE CURRENT EMBODIMENT

Figure 1:
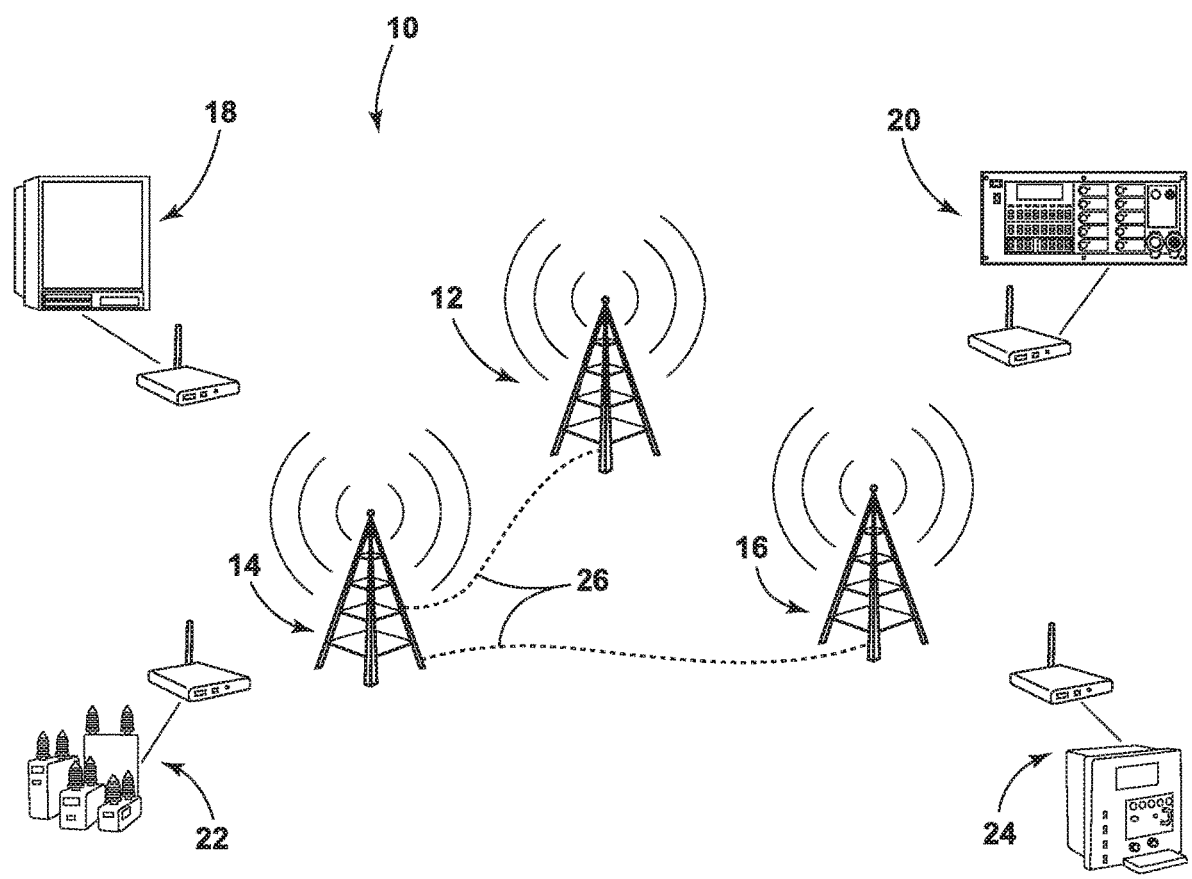
FIG. 1 illustrates a system overview in accordance with the current embodiment.

Referring now to FIG. 1, a timing authentication system 10 in accordance with the current embodiment is illustrated and generally designated 10. The timing authentication system 10 includes multiple geographically distributed ground stations 12, 14, 16 and at least one receiver 18, 20, 22, 24 within wireless radio communication range of at least two of the ground stations. The receivers constitute part of an electrical power distribution system, however in other embodiments the receivers can be stand-alone devices or form part of another system. The ground stations 12, 14, 16 are geographically distributed from each other (and the receivers) and are in data communication with each other to determine a shared key according to a QKD protocol. For example, the ground stations 12, 14, 16 are separated from each other by at least 1 km in the current embodiment. The system includes a control center, which is co-located with the first ground station 12 in the current embodiment, and in data communication with the remaining ground stations 14, 16. Each such feature of the system 10 is discussed in greater detail below.

Each ground station 12, 14, 16 includes a trusted clock, a QKD system, and a wireless transmitter. As used herein, a "trusted clock" means a tamper evident or tamper resistant real time clock, whose output is used to create an unalterable timestamp for digital data. Each ground station 12, 14, 16 also includes suitable hardware for QKD, for example phase encoded QKD or continuous variable (CV) QKD. In some embodiments, the QKD hardware can include the CLAVIS$^2$ system available from ID Quantique SA of Geneva, Switzerland. This system is described in U.S. Pat. No. 6,438,234, entitled "Quantum Cryptography Device and Method," issued Aug. 20, 2002, and "Quantum Key Distribution over 67 km with a plug & play system," D. Stucki et al. (2002), the disclosures of which are incorporated herein by reference in their entirety. Other QKD systems can be used in other embodiments as desired. In addition, each ground station 12, 14, 16 is in data communication with another ground station 12, 14, 16 over a quantum channel 26. The quantum channel 26 includes an optical fiber in the current embodiment. In other embodiments, the quantum channel 26 includes an optical point-to-point (free-space) channel. Lastly, each ground station includes a wireless transmitter, for example a wireless beacon or antenna, the wireless transmitter being adapted to broadcast timing signals featuring quantum correlations. For increased security, the wireless transmitter can be adapted to broadcast the timing signals according to spread spectrum techniques, optionally over RF bands not currently in use.

Figure 2:
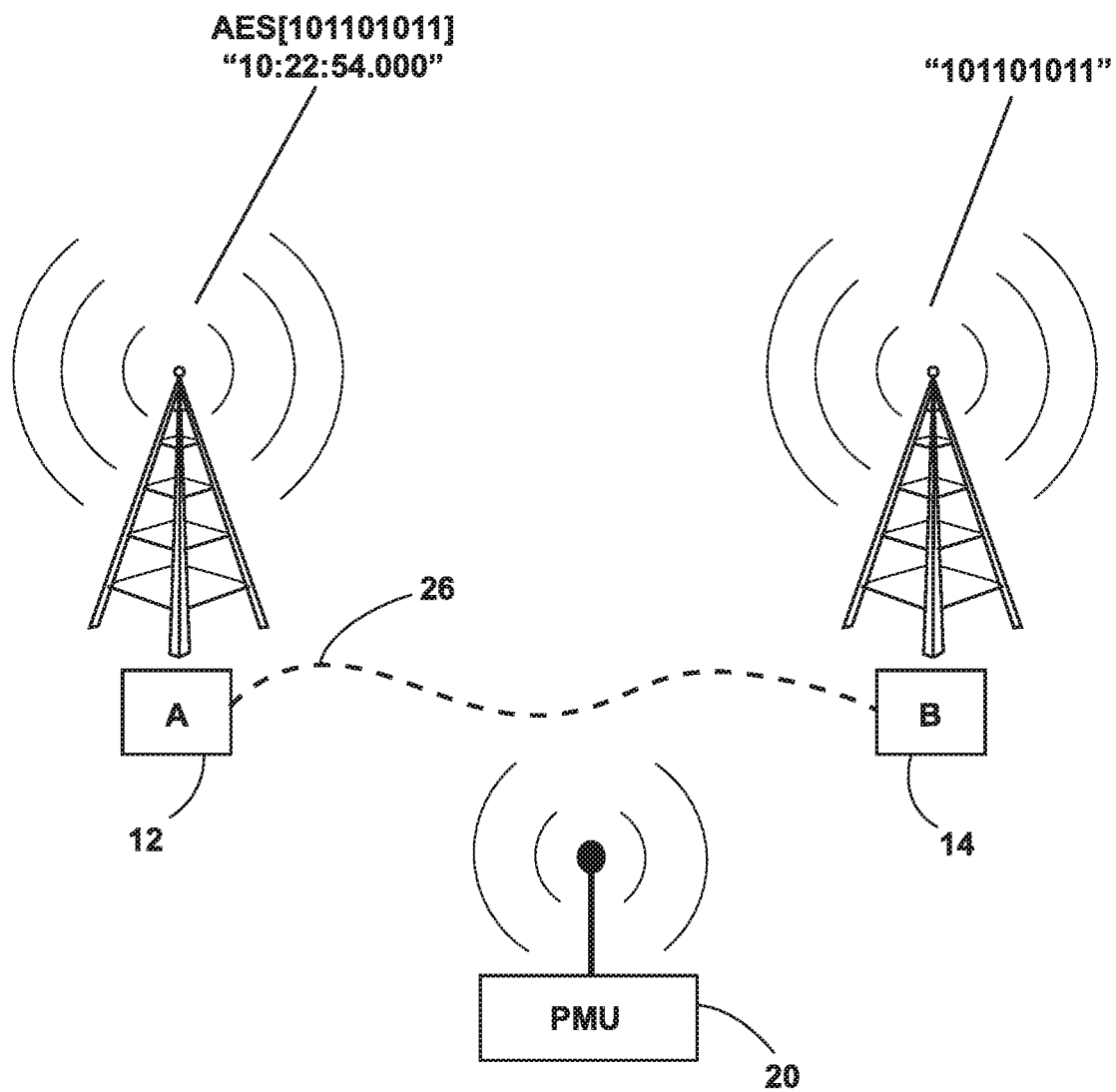
FIG. 2 illustrates a diagram of the ground stations in relation to the receiver.

The receivers 18, 20, 22, 24 constitute part of an electrical power distribution system and each includes a local clock. The receivers can include, for example, a supervisory control and data acquisition (SCADA) system 18, 24, a phasor measurement unit (PMU) 20, or a recloser 22. As shown in FIG. 2, each receiver includes an antenna for receipt of the encrypted timing signal and a shared key. Each receiver also includes an internal processor that is adapted to (a) decode the timing signal using the shared key, (b) correct the timing signal for time-of-flight from the originating ground station, and (c) correct the local clock. As set forth in more detail below, the receiver's processor can cause a transmission to be sent to one or more of the ground stations to confirm decoding of the timing signal by the receiver.

As shown in FIG. 2, for example, two ground stations 12, 14 are geographically separated from each other, each with a trusted clock, and are connected over a quantum channel 26. The ground stations 12, 14 transmit wireless timing signals on a predetermined schedule, similar to that of GPS satellites. However, the wireless timing signals include data generated at the ground stations 12, 14 via the quantum channel 26. In one example, this data can include a string of binary data generated at the ground stations 12, 14 using a QKD system. The first ground station 12 uses its version of the shared string to encrypt the time stamp message before broadcast, whereas the second ground station 14 broadcasts the shared string in the open (e.g., unencrypted). To the PMU 20, each wireless message is indecipherable on its own, but when taken together, can be used to decode the encrypted time stamp message from the first ground station 12. If an adversary attempts to spoof this system, either by transmitting a faked time stamp or a faked key, the PMU 20 will register a nonsensical decrypted message and will reject the spoofed time stamp message. In this embodiment, the time stamp message is encrypted according to the AES-256 encryption scheme, but other encryption schemes can be used in other embodiments as desired.

The infrastructure for the timing authentication system 10 can be used for other tasks. For example, reclosers, SCADA-based capacitors, and advanced metering infrastructure (AMI) components all require secure communication with a utility's control center. Specifically, the issuance of broadcast commands from a utility to these devices requires strong message authentication and sender verification. Overlaying a quantum communications network 26 on the existing wireless infrastructure enhances the security of these systems. In addition, the timing authentication system can be used to issue commands to large numbers of devices simultaneously using multi-beacon authentication.

Figure 3:
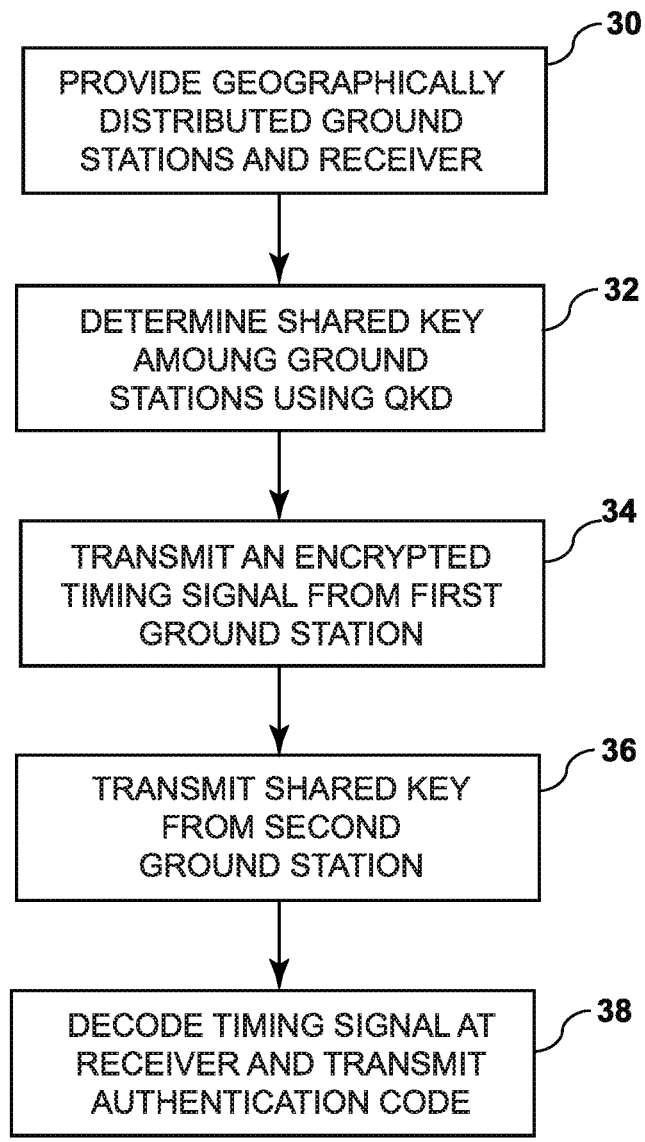
FIG. 3 illustrates a flow-diagram of a method in accordance with the current embodiment.

Referring now to FIG. 3, a method of operation is illustrated. The method generally includes providing geographically distributed ground stations and a receiver (step 30), determining a shared key among the ground stations using QKD (step 32), transmitting an encrypted timing signal from a first ground station (step 34), transmitting the shared key from a second ground station (step 36), and decoding the timing signal at the receiver and optionally transmitting an authentication code or other information (step 38). Each step is discussed in greater detail below.

At step 30, the method includes providing at least two geographically distributed ground stations and at least one receiver. As noted above in connection with FIG. 1, the ground stations are connected to each other over a quantum channel and each includes a trusted clock, a QKD system, and a wireless transmitter. In addition, the receiver includes an antenna, an optional transmitter, a local clock, and a processor for decoding the encrypted timing signal. The receiver forms part of an electrical power distribution system in the current embodiment, and can include, for example, a SCADA, a PMU, or a recloser.

At step 32, the method includes determining a shared key among the ground stations. This method includes any suitable QKD protocol, as any attempt by an eavesdropper to read out information encoded quantum mechanically will introduce noise that can reveal the eavesdropper's presence. Suitable QKD protocols include, for example, single-photon QKD, entangled photon QKD, and quantum time distribution (QTD) QKD. Where the system 10 includes more than two ground stations, the present method can include quantum correlations between only two ground stations, with the remaining ground stations optionally transmitting false data to confuse adversaries. Alternatively, correlated data can be shared among three or more ground stations through quantum secret sharing, whereby additional parties act on a single photon between a sender and a recipient, or a trusted-node QKD, which can be used to tie QKD nodes together.

At step 34, the method includes transmitting an encrypted timing signal from a first ground station as a first timing signal. This step includes encrypting the time stamp message using the QKD-derived shared key and any conventional encryption algorithm, including the AES-256 encryption algorithm. This step is repeated at regular intervals by the wireless transmitter of the first ground station, resulting in the periodic transmissions of encrypted time stamp messages from a ground station having a trusted clock, optionally under control of a public utility.

At step 36, the method includes transmitting the shared key from a second ground station as a second timing signal. Like step 34, this step is repeated at regular intervals. In other embodiments the first and second timing signals are transmitted at irregular times. This protocol includes the broadcast of time stamps at random times known only to the control center, which can be co-located with one of the ground stations. The receivers collect data relative to these random time stamps, and report this information back to the control center. An adversary's time stamps would not be correlated with the true time stamps, providing the control center with knowledge of the adversary's spoofing attempts.

At step 38, the method includes decoding the timing signal at the receiver and optionally transmitting an authentication code or other information. This step is performed according to the same encryption protocol used by the first ground station, e.g., AES-256, the decoded timing signal is corrected for time of flight, and the receiver's local clock is corrected. In addition to receiving an encrypted time stamp message, the receivers can generate an output at step 38. For example, the encrypted time stamp message can include an authentication code. In this embodiment, the receivers use the shared key to decode the authentication code and include the authentication code in a report sent back to a control center, optionally as a wireless transmission to the first or second ground station. The control center then receives the authentication code to verify the receiver did in fact receive the time stamp message.

In another embodiment of the present method, the encrypted timing signals are formatted so that different combinations of signals result in valid signals at the receiver. For example, four ground stations can produce signals that yield two distinct messages. The signal pairing can be changed from one transmission to the next, thereby introducing additional complexity for spoofing attacks. Alternatively, the timing signals can be formatted so that only two are required for authentication, with the others sent as superfluous transmissions.

The above system and method can therefore provide utilities with complete end-to-end control of security for time sensitive data and also offer improved security through a relatively modest infrastructure. Unlike GPS-based timing schemes, the above system and method features timing signals that are a priori unknown, making the timing signals appear truly random to an eavesdropper and very difficult to spoof. As also discussed above, the timing signals include quantum correlations that provide several avenues for authenticating not just the timing signals themselves, but also power system data (e.g., sent from a receiver to a ground station) and other communication tasks.

EXAMPLE

In one non-limiting example, two high-gain monopole antennas were installed at ground stations separated by a distance of 2.1 miles. A dedicated simplex fiber channel was provided between the ground stations for the CLAVIS$^2$ QKD system. Optical time domain reflectometry (OTDR) was used to measure the distance (3.09 miles) and optical loss (3.7 dB loss) of the fiber channel. Using Quadrature Phase Shift Keying (QPSK), the average secret key generation rate (SKR) was 777 bits/sec and the average quantum bit error rate (QBER) was 2.6%. The secret key was stored as a continually-appended file locally on each computer managing the QKD system. The first ground station transmitted an encrypted timing signal and the second ground station provided a delayed cleartext key transmission. The receiver included a USRP N210 software radio system. The timing signal was recovered with a success rate exceeding 95%.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method for distribution of a quantum-authenticated timing signal, the method comprising:
   providing a plurality of ground stations and at least one receiver within wireless range of the plurality of ground stations;
   transmitting a quantum signal from a first one of the plurality of ground stations and receiving the quantum signal at a second one of the plurality of ground stations;
   determining a shared key based on information shared between the first one of the plurality of ground stations and the second one of the plurality of ground stations;
   transmitting, from the first one of the plurality of ground stations, to the receiver, an encrypted timing signal using the shared key;
   transmitting, from the second one of the plurality of ground stations, to the receiver, the shared key; and
   decoding, by the receiver, the encrypted timing signal from the first one of the plurality of ground stations using the shared key from the second one of the plurality of ground stations.

2. The method according to claim 1 further including correcting a local clock of the receiver after the step of decoding the encrypted timing signal.

3. The method according to claim 1 wherein the encrypted timing signal includes authentication data known only to the first one of the plurality of ground stations.

4. The method according to claim 3 further including transmitting, from the receiver, an authentication signal based on the authentication data from the encrypted timing signal.

5. The method according to claim 1 wherein each of the plurality of ground stations includes a trusted clock.

6. The method according to claim 1 wherein transmitting the quantum signal from the first one of the plurality of ground stations is performed over a fiber optic channel.

7. The method according to claim 1 wherein determining the shared key includes quantum key distribution by the first and second ones of the plurality of ground stations.

8. The method according to claim 1 wherein determining the shared key includes quantum secret sharing by each of the plurality of ground stations.

9. The method according to claim 1 wherein the receiver forms part of a phasor measurement unit.

10. The method according to claim 1 wherein the plurality of ground stations are geographically separated from each other.

11. A system for distribution of a quantum-authenticated timing signal, the system comprising:
- a plurality of ground stations that are in data communication with each other to determine a shared key according to a quantum key distribution protocol, each of the plurality of ground stations including a trusted clock and a wireless transmitter; and
- a receiver within wireless range of the plurality of ground stations and including a local clock, wherein a first one of the plurality of ground stations is adapted to transmit an encrypted timing signal using the shared key and wherein a second one of the plurality of ground stations is adapted to transmit at least a portion of the shared key, and wherein the receiver is adapted to decode the encrypted timing signal from the first one of the plurality of ground stations using the shared key from the second one of the plurality of ground stations to update the local clock.

12. The system according to claim 11 wherein each of the plurality of ground stations are geographically separated from each other.

13. The system according to claim 11 wherein at least two of the plurality of ground stations are connected over a quantum channel.

14. The system according to claim 11 wherein the receiver forms part of a phasor measurement unit.

15. The system according to claim 11 wherein the receiver forms part of an electrical power distribution system.

16. The system according to claim 11 wherein the receiver forms part of a supervisory control and data acquisition system.

17. A receiver for decoding a quantum-authenticated timing signal, the receiver comprising:
- an antenna within wireless range of a plurality of geographically distributed ground stations; and
- a processor coupled to the antenna and adapted to (a) decode an encrypted timing signal from a first one of the plurality of geographically distributed ground stations using a public key from a second one of the plurality of geographically distributed ground stations and (b) cause a transmission to be sent to one of the plurality of geographically distributed ground stations to confirm decoding of the encrypted timing signal by the processor.

18. The receiver according to claim 17 wherein the receiver includes a local clock and wherein the processor is further adapted to update the local clock based on the encrypted timing signal.

19. The receiver according to claim 17 wherein the receiver forms part of a phasor measurement unit.

20. The receiver according to claim 17 wherein the receiver forms part of a supervisory control and data acquisition system.

* * * * *